United States Patent [19]

Prybella et al.

[11] Patent Number: 4,795,314
[45] Date of Patent: Jan. 3, 1989

[54] CONDITION RESPONSIVE PUMP CONTROL UTILIZING INTEGRATED, COMMANDED, AND SENSED FLOWRATE SIGNALS

[75] Inventors: John R. Prybella, Lakewood; Terry D. Boucher, Littleton, both of Colo.

[73] Assignee: Cobe Laboratories, Inc., Lakewood, Colo.

[21] Appl. No.: 88,685

[22] Filed: Aug. 24, 1987

[51] Int. Cl.$^4$ .................... F04B 49/06; A61M 37/00; B04B 13/00

[52] U.S. Cl. ........................ 417/43; 417/45; 604/6; 494/1

[58] Field of Search ............ 417/43, 20, 45, 53, 417/477; 494/1, 22; 604/4, 6; 73/861.77, 861.78

[56] References Cited

U.S. PATENT DOCUMENTS

| | | |
|---|---|---|
| 3,780,579 | 12/1973 | Barnard ..................... 73/861.77 |
| 3,949,734 | 4/1976 | Edwards et al. ................. 417/43 X |
| 4,063,824 | 12/1977 | Baker et al. .......................... 417/43 |
| 4,185,629 | 1/1980 | Cullis et al. ........................ 494/1 X |
| 4,221,543 | 9/1980 | Cosentino et al. ............... 417/45 X |
| 4,401,431 | 8/1983 | Arp ....................................... 604/6 X |
| 4,447,191 | 5/1984 | Bilstad et al. ..................... 417/45 X |
| 4,481,827 | 11/1984 | Bilstad et al. ....................... 604/6 X |
| 4,568,248 | 2/1986 | Harders ................................ 417/43 |
| 4,657,529 | 4/1987 | Prince et al. ........................... 604/6 |

FOREIGN PATENT DOCUMENTS 2021821  12/1979  United Kingdom ............... 417/43

OTHER PUBLICATIONS

*DC Motors Speed Controls Servo Systems* (Electro-Craft Corporation, Hopkins, Minn.), pp. 3-1 to 3-11.
DiStefano, J. J. III et al., *Schaum's Outline of Theory and Problems of Feedback and Control Systems* (McGraw-Hill Book Company), 1967, pp. 162-170.

*Primary Examiner*—Paul F. Neils

[57] ABSTRACT

A pump control apparatus including a variable speed pump controllable in response to a pump drive signal, a signal generator generating a commanded flowrate signal indicating desired flowrate of the pump, a flowrate sensor providing a sensed flowrate signal indicating sensed flowrate of the pump, and an integrator connected to the sensor and generator to receive and integrate the commanded flowrate signal and the sensed flowrate signal and to provide the pump drive signal based on the difference in integrated values of the signals so as to achieve desired commanded volume over time.

20 Claims, 3 Drawing Sheets

CONDITION RESPONSIVE PUMP CONTROL UTILIZING INTEGRATED, COMMANDED, AND SENSED FLOWRATE SIGNALS

FIELD OF THE INVENTION

The invention relates to controlling variable flowrate pumps, e.g., peristaltic pumps used in medical devices.

BACKGROUND OF THE INVENTION

Variable flowrate pumps can be automatically controlled by providing electrical signals indicating desired flowrate. When the pump is a positive volume displacement pump such as a peristaltic pump, a signal to move the pump actuator (e.q., an electrical motor) a specified amount should result in pumping the corresponding volume of liquid. Under some conditions a pump may not pump the commanded amount. E.g., when pumping at a low flowrate and thus low motor speed, the motor may cog, rotating in increments in an unsmooth manner, with resulting loss in accurate flow control. Some other examples are when the pump is commanded to pump at a speed above its upper limit, or when pump operation is impeded, e.g., by jamming or restricted movement of pump parts.

SUMMARY OF THE INVENTION

It has been discovered that one could obtain very accurate control of the volume pumped by a variable flowrate pump by sensing the flowrate of the pump and using an integrator to provide a drive signal to the pump that is based on the difference in integrated values of the sensed flowrate and the desired flowrate commanded to be pumped. The integrator automatically keeps track of the volume of liquid commanded to be pumped and the sensed volume pumped and makes adjustments to the drive signal to account for discrepancies between the two, e.g., increasing the drive signal when the sensed volumes flowing are less than those commanded and vice versa. It thus guarantees accurate delivery of commanded volume regardless of failure of the pump to accurately respond to drive signal values, something that is very important in the preferred application of metering liquid in medical devices to achieve accurate control of a medical procedure. E.g., when the control is used for pumps on the anticoagulant, blood, plasma, and platelet lines of a continuous blood centrifuge connected to a patient/donor, accurate control is provided over a very large range of flowrates, e.g., the highest flow rate being as much as 200 times as large as the lowest flowrate.

In preferred embodiments the desired flowrate is indicated by a stream of command pulses, each of which represents a volume of liquid to be pumped; the sensed flowrate is indicated by stream of sensed flow pulses, each of which represents a volume of liquid actually pumped; the pump is a positive volume displacement pump driven by a variable speed motor, and the flowrate is sensed by a digital encoder providing a sensed flow pulse upon a given rotation; the integrator is an up-down counter connected to count up upon receiving a command pulse and to count down upon receiving a sensed flow pulse, the drive signal being a digital output of the up-down counter; the up-down counter is loaded with a high count upon providing its upper carry-out output and is cleared when it provides its lower carry-out output to maintain its respective maximum or minimum output when the upper or lower counting limit has been crossed; the up-down counter is cleared when a lack of command pulses are sensed, to prevent activation by manual turning of the pump; a digital-to-analog converter converts the digital signal of the up-down counter to an analog pump drive signal; a summation circuit adds the analog pump drive signal to an analog control signal indicating the current through the motor to smooth motor rotation and thus fluid flow; an overtorque-indicating circuit compares a voltage based on the current through the motor with a reference voltage; and an overspeed-indicating circuit compares the voltage provided to the motor with the voltage of a power source, to indicate that the motor is operating at or close to its maximum speed.

Other advantages and features of the invention will be apparent from the following description of a preferred embodiment thereof and from the claims.

DESCRIPTION OF THE PREFERRED EMBODIMENT

The preferred embodiment will now be described.

DRAWINGS

STRUCTURE

Figure 1:
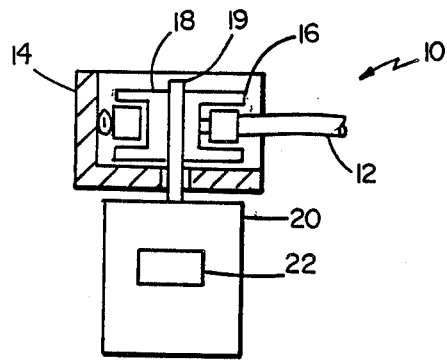
FIG. 1 is a diagrammatic partially sectional elevation of a positive displacement pump controlled by control circuitry according to the invention.

Referring to FIG. 1, there is shown peristaltic pump 10, including flexible tube 12, which is intermittently and progressively occluded between fixed race 14 and rollers 16 carried on rotor 18, which is driven by variable speed DC gear motor 20. Pump 10 (available from Barber-Colman Company) uses a permanent magnet design and includes digital encoder 22, which is shown diagrammatically on FIG. 1, provides 363 digital pulses for each revolution of rotor shaft 19.

Figure 1A:
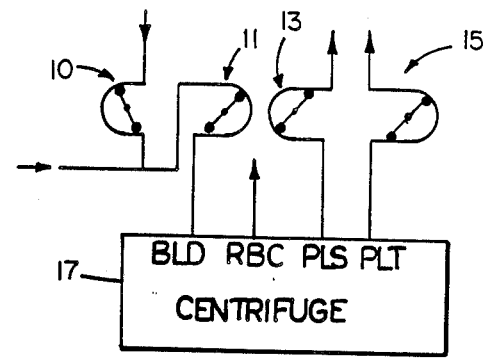
FIG. 1A is a block diagram of a pump system according to the invention.

Referring to FIG. 1A, it is seen that pump 10 is used with three additional identical pumps 11, 13, 15 to pump anticoagulant, whole blood, plasma, and platelets to or from a blood separating centrifuge, shown diagrammatically as 17 in the drawing. Flexible tube 12 and the other flexible tubes included in pumps 11, 13, 15 are part of a disposable tubing set, also including the disposable separation channel (not shown) of centrifuge 17. Different tubing sets can be employed for different blood treatment or component collection procedures, using the same permanent rotors of pumps 10, 11, 13, 15, sometimes to pump different fluids, and to pump them in different directions.

Figure 2:
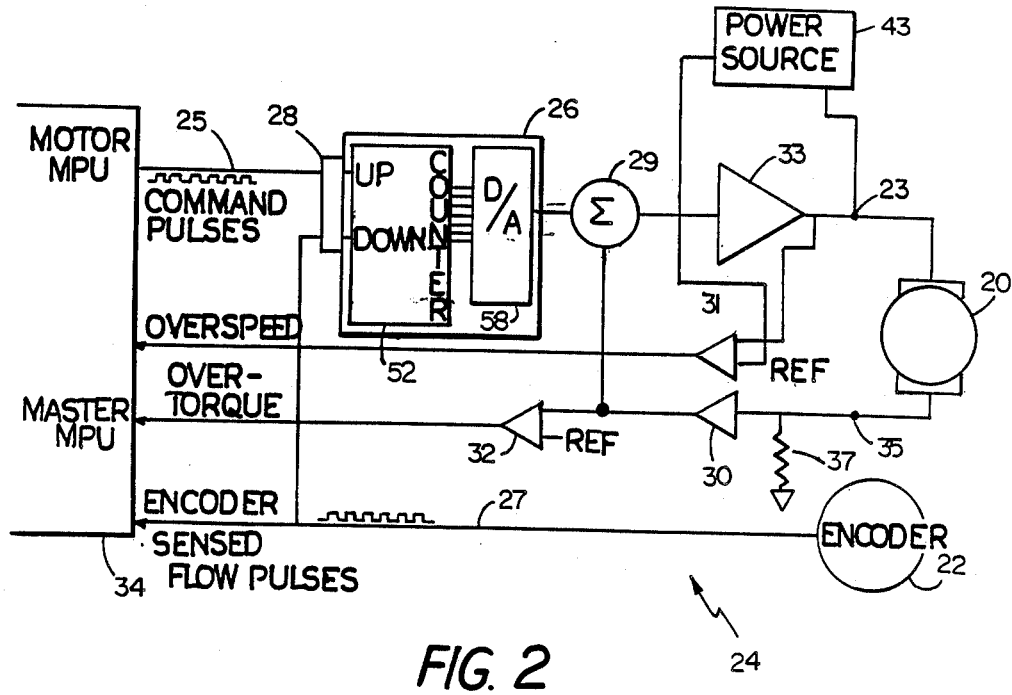
FIG. 2 is a block diagram of said control circuitry.

Referring to FIG. 2, control circuitry 24 for driving pump 20 includes integrating circuitry 26 with its associated input manipulation circuitry 28, analog summing circuitry 29, input amplifier circuitry 30, overspeed comparing circuitry 31, overtorque comparing circuitry 32, output amplifier circuitry 33, microprocessor circuitry 34, and power source 43.

Commanded flowrate signal line 25 from microprocessor 34 is connected to provide command pulses through circuitry 28 to the up-counting input of up-down counter 52 of integrating circuitry 26. Sensed flowrate signal line 27 from encoder 22 is connected to provide sensed flow pulses both to the down-counting input of up-down counter 52 through circuitry 28, and to microprocessor circuitry 34. Integrating circuitry 26 also includes digital-to-analog converter (DAC) 58, connected to provide an analog pump drive signal for summing with the output of input amplifier 30 at summing circuitry 29, the output of which is input to output amplifier circuitry 33, powered by 24-volt source 43. The output of output amplifier circuitry 33 at node 23 is connected to drive motor 20.

Overspeed comparing circuitry 31 is connected to receive and compare the output voltage of amplifier circuitry 33 at node 23 with a reference voltage, and to provide an output to microprocessor 34 that indicates that motor 20 is operating at or close to its maximum speed. The other lead of motor 20, at node 35, is connected through resistor 37, through which the majority of current flows, to qround. Input amplifier circuitry 30 outputs a signal that is a function of the voltage at node 35 (and thus the current through motor 30 and resistor 37) to summing circuitry 29 (as mentioned above) and to overtorque comparing circuitry 32. A reference voltage is also input into overtorque comparing circuitry 32, the output of which is input into microprocessor 34 to indicate that large currents are being drawn.

Figure 3:
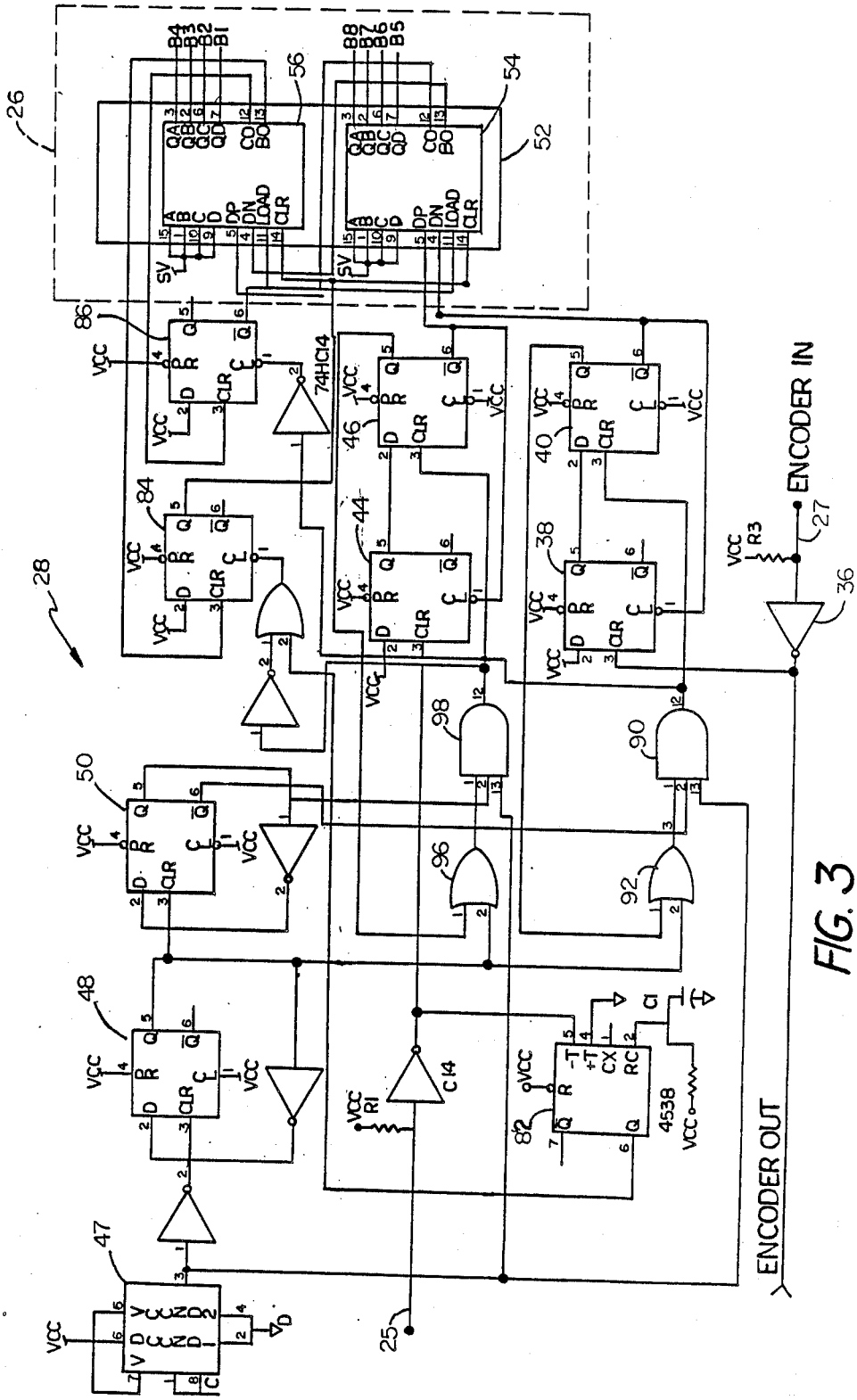
FIGS. 3-4 are a schematic of portions of the FIG. 2 block diagram.

Referring to FIG. 3, it is seen that input manipulation circuitry 28 includes D-flip-flops 38, 40, 44, 46, 48, 50 (74HCT74), oscillator 47 (74LS724 or NE 555), one-shot 82 (74HC4538), and various inverters (74HC14), OR gates (74HCT32) and AND gates (74HCT11) connected as described below. Counter 52 of integrating circuitry 26 is made of two 4-bit counters (74HC193) 54, 56 connected to provide a single 8-bit counter. The CO and BO upper and lower carry-out outputs of counter 54 are connected to the up and down inputs of counter 56 respectively.

The sensed flow pulses from encoder 22 and command pulses from microprocessor 34 are double-clocked to synchronize them prior to presentation to counter 52. The output of encoder 22 is fed through a high-speed CMOS gate 36 (for noise immunity) to the clock input of D-flip-flop 38. The output of D-flip-flop 38 is fed into the D-input of D-flip-flop 40, which is clocked by the combination at AND gate 90 of the output of oscillator 47, the output of oscillator 47 divided by four from the complement of Q output of D-flip-flop 50, and the combination at OR gate 92 of the Q output of D-flip-flop 40 and the output of oscillator 47 divided by two from D-flip-flop 48. The commanded flowrate signal input from microprocessor 34 is likewise treated utilizing D-flip-flops 44 and 46 and their associated OR gate 96 and AND gate 98. The complement of Q output of D-flip-flop 46 is fed into the downcount input of counter 52 of integrator 26. The complement of Q output of D-flip-flop 46 is fed into the upcount input of counter 52. The complements of Q outputs of D-flip-flops 40 and 46 are also fed into the clear inputs of D-flip-flops 38 and 44, respectively.

One-shot 82, used to monitor command pulses on line 25, has its output combined at OR gate 94 with the inverse of the output of AND gate 98 and fed inverted into the clear input of D-flip-flop 84. The output of D-flip-flop 84 is input into the clear inputs of 4-bit counters 54, 56, to clear them when there is an absence of command pulses on line 25. The clock input of flip-flop 84 is connected to lower carry-out output BO of counter 56, to clear counters 54, 56 upon receiving a lower carry-out.

The inverse of the output of AND gate 90 is connected to the clear input of D-flip-flop 86. The complement of Q output of D-flip-flop 86 is connected the load inputs of 4-bit counters 54 and 56.

The upper carry-out CO output of counter 56 is input into the clock input of D-flip-flop 86, the complement of the Q output of which is connected inverted to the load input of counters 54, 56, to load the maximum count into the counters (provided by handwiring all preload inputs A, B, C, D to 5 volts) upon receiving an upper carry-out.

Figure 4:
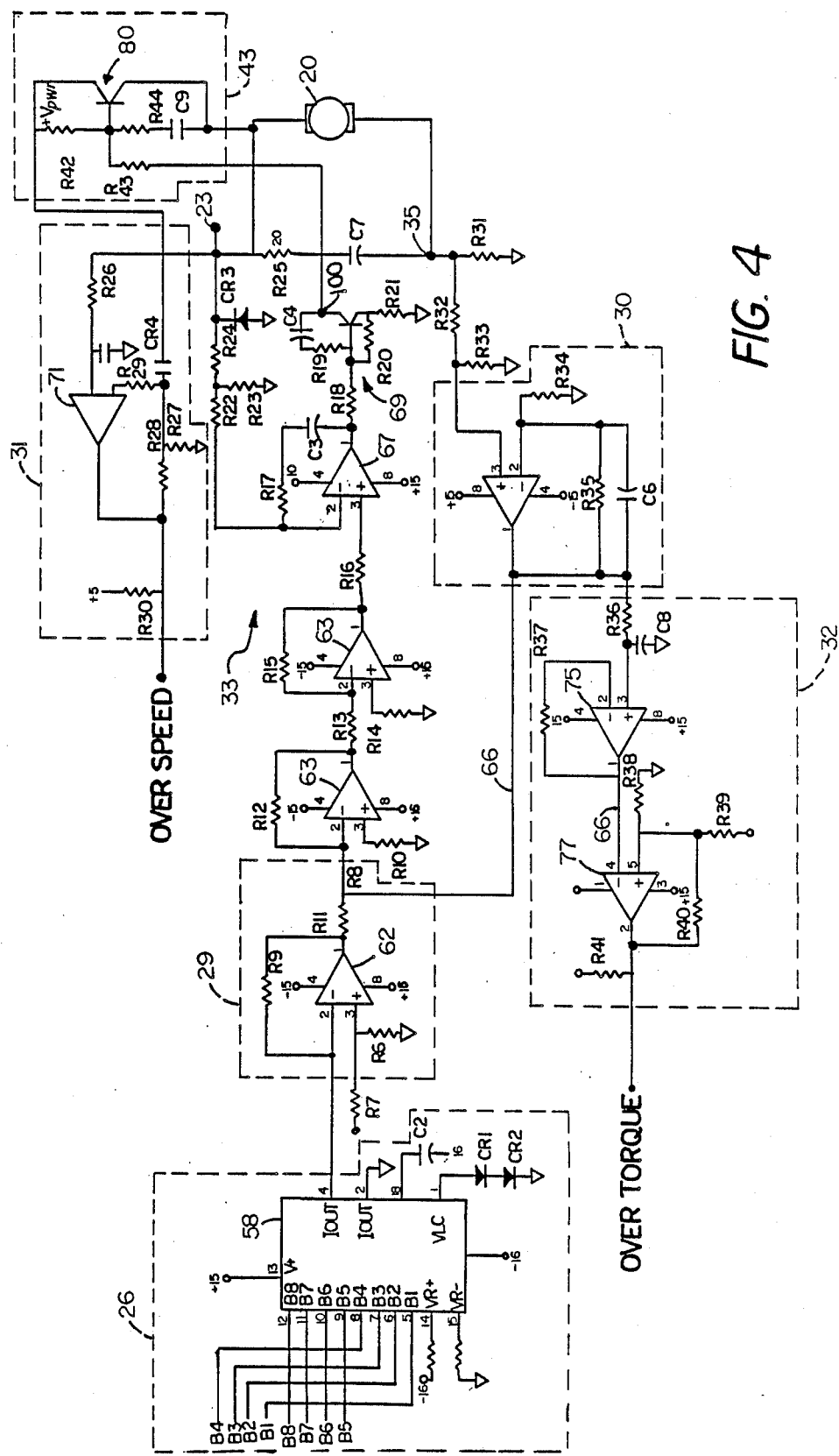

Referring to both FIGS. 3 and 4, the QA–QD outputs of counters 54, 56 provide a digital pump drive signal provided to inputs B1–B8 of DAC 58 (DAC0800).

Referring to FIG. 4, summing circuit 29 includes operational amplifier 62 (LF412N), which receives the output of DAC 58 as an input. The output of op amp 62 is summed with an analog control signal output of amplifier 30 and is fed into op amp 63 (LM1458N) of output amplifier circuit 33.

Output amplifier circuit 33 also includes op amps 65, 67 (LM1458N) and NPN transistor 69 (TIP29). The output of op amp 63 is fed into op amp 65, the output of which is fed into op amp 67. The output of op amp 67 is fed into the base of transistor 69. The collector of transistor 69 is connected to power transistor 80 (2N5883) through the base resistor (R43) at the power source circuit 43.

The motor armature voltage at node 23 is also connected as an input to overspeed comparing circuit 31, which includes op amp 71 and associated resistors. The other input of op amp 71 is connected to a reference voltage that is one diode drop (0.7 volt) less than $+V_{pwr}$. $+V_{pwr}$ can range from 24 VDC to 40 VDC.

Node 35, on the other line to motor 20, is fed to ground via 0.1 ohm, 3W resistor 37. The voltage across this resistor is input into input amplifier circuitry 30, the output of which is the scaled control voltage provided to summing circuit 29.

The scaled analog control signal output of amplifier 30 is also input into overtorque comparing circuit 32, including operational amplifier 75 (LF412N) and operational amplifier 77 (LM339), the output of the former being fed into the latter and compared with a reference voltage.

The remaining components shown on FIGS. 3 and 4 are as follows:

| Resistors | |
|---|---|
| R1, R3, R16, R27, R30, R32, R34, R38, R41 | 10K |
| R2 | 120K |
| R4, R5 | 7.6K |
| R6, R9 | 5.6K |
| R7 | 820K |
| R8 | 30K |
| R10 | 8.2K |
| R11 | 15K |
| R12, R39 | 20K |
| R13, R15, R28, R40 | 100K |
| R14 | 47K |
| R17 | 10 |
| R18, R19 | 200 |
| R20 | 470, ½ W |
| R21 | 50, 5 W |
| R22 | 9.1K |
| R23 | 2K |
| R24 | 4.7K |
| R25 | 20 |
| R26, R29, R36, R37 | 1 M |
| R31 | 0.1, 3 W |

-continued

|  |  |
|---|---|
| R33, R35 | 200K |
| R42 | 15 |
| R43 | 25 |
| R44 | 100 |
| Capacitors | |
| C1 | 10 μF |
| C2 | 0.01 μF |
| C3, C4, C5, C6, C7, C8, C9 | 0.1 μF |
| Diodes | |
| CR1, CR2, CR4 | IN4148 |
| CR3 | IN5416 |

Operation

In operation pump 10 pumps liquid through tube 12 by the action of rollers 16, which occlude portions of tube 12 and progressively advance the occluded portions and the liquid trapped in front of the portions when driven by motor 20.

Pump 10 is commanded to pump at a given rate by command pulses provided by microprocessor 34, acting as a commanded flowrate signal generator, over line 25 to integrating circuitry 26, each pulse representing a given volume to be pumped. Encoder 22 outputs a stream of sensed flow pulses that each represent a volume of liquid (the same volume as for commanded pulses) that has been pumped. Integrating circuitry 26 provides a pump drive signal that is based on the difference in the integrated values of the command pulses and sensed flow pulses, and this pump drive signal is used to adjust the speed of motor 20.

Prior to counting at counter 52 of integrating circuitry 26, the streams of command pulses and sensed flow pulses are double-clocked by D-flip-flops 38, 40, 44, and 46 to synchronize the pulses provided to counter 52. Counter 52 produces an 8-bit word indicative of the difference between the number of command pulses received at the up count input and the sensed flow pulses received at the down count input. Each command pulse increases the number coming from the counter 52 while each sensed flow pulse from encoder 22 decreases the number. Counter 52 thus functions as a digital integrator that has an error of 0% as a function of run time but has an offset error limited to approximately two-thirds of a revolution of motor 22, owing to the voltage required to compensate the back EMF of the motor at a given speed of rotation. The 8-bit word is a digital pump drive signal that is converted to an equivalent analog pump drive signal at DAC 58. If motor 20 is running at the right speed, there is no net voltage change from DAC 58. If motor 20 is running too slow, the voltage from DAC 58 increases until the speed is corrected. Conversely, if the speed is too fast, the voltage from DAC 58 decreases.

The analog pump drive signal is amplified at operational amplifier 62 and is summed with a scaled control voltage, proportional to the motor current, from circuit 30, to compensate for normal variations of torque seen by the pump. This smooths the rotation of motor 20, thereby smoothing the fluid flow. The summed voltage is then amplified in output amplifier 33, which is powered by power source 43, and provided to motor 20. The drive signal to motor 20 cannot exceed the voltage from source 43.

The amplified drive signal voltage at node 23 is input into overspeed comparing circuit 31, which compares this voltage to a reference voltage that is 0.7-volt less than $+V_{pwr}$ from power source 43. This comparison is used to alert microprocessor 34 to the fact that motor 20 is being driven near the limits of the power source's capacity.

The current through motor 20 is a function of the torque of motor 20. The scaled control voltage from circuit 30, which indicates current through motor 20, is compared at operational amplifier 77 to a reference voltage that is chosen to prevent the motor from being overdriven. E.q., if pump 10 becomes jammed, motor 20 could draw large currents to meet rotation requirements set by integrating circuitry 26. The output of operational amplifier 77 is provided to microprocessor 34 to alert it to an overtorque condition.

To protect motor 20 form accidental activation, e.g., if rotor 18 is manually rotated, counter 52 is placed in a clear state by flip-flop 84 and one-shot 82 when there is no command pulse train coming from microprocessor 34. This results in the analog pump drive signal provided by converter 58 to be offset to a voltage below ground.

Flip-flop 84 is also used in conjunction with flip-flop 86 to prevent counter 52 from incrementing "FF" to "00" or from decrementing "00" to "FF". This causes counter 52 to maintain its respective maximum or minimum output when the upper or lower counting limit has been crossed.

Pumps 11, 13, and 15 for blood, plasma, and platelets are controlled in a similar manner by microprocessor 34. Accurate control is provided over a very large range of flowrates, e.g., the small flowrates for anticoagulant additive, which must be precisely metered, and platelets, and the large flowrates for whole blood.

Other Embodiments

Other embodiments of the invention are within the scope of the following claims. In place of digital up-down counter 52, an analog integrator could be used; e.g., a capacitor could be charged by a command flowrate signal and discharged by a sensed flowrate signal.

What is claimed is:

1. Pump control apparatus comprising
a variable flowrate pump including an electric motor controllable in response to a pump drive signal,
a signal generator generating a commanded flowrate signal indicating desired flowrate of said pump,
a flowrate sensor providing a sensed flowrate signal indicating sensed flowrate of said pump, and
an integrator connected to said sensor and generator to receive and integrate said commanded flowrate signal and said sensed flowrate signal, said integrator maintaining an electrical signal representing the difference over time in volume commanded to be pumped and the volume pumped, said integrator providing said pump drive signal based on said electrical signal, said pump drive signal being increased based on said commanded flowrate signal, thereby increasing the speed of said motor, and being decreased based on said sensed flowrate signal, thereby decreasing the speed of said motor, so as to achieve desired commanded volume over time.

2. The apparatus of claim 1 wherein said pump is a peristaltic pump.

3. The apparatus of claim 1 wherein said commanded flowrate signal is a stream of commanded pulses, each of which indicates a volume of liquid to be pumped.

4. The apparatus of claim 3 wherein said sensed flowrate signal is a stream of sensed flow pulses, each of which indicates a volume of liquid actually pumped.

5. The apparatus of claim 4 wherein said variable flowrate pump is a positive volume displacement pump, and said flowrate sensor comprises a digital encoder providing a said sensed flow pulse upon a given rotation of said electric motor.

6. The apparatus of claim 4 wherein said electric motor is a variable speed D.C. motor, and said pump drive signal is an analog pump drive signal.

7. The apparatus of claim 6 further comprising a summation circuit to add said analog pump drive signal to an analog control signal indicating a current through said variable speed D.C. motor.

8. The apparatus of claim 6 further comprising an overtorque indicating circuit connected to receive a voltage based on current through said motor and including a comparator to compare said voltage with a reference voltage.

9. The apparatus of claim 6 wherein said motor is powered by a power source having a set voltage, the voltage provided to said motor being less than said set voltage and being controlled by said analog pump drive signal.

10. The apparatus of claim 11 further comprising an overspeed indicating circuit connected to receive said voltage provided to said motor and inluding a comparator to compare it to said set voltage.

11. The apparatus of claim 4 wherein said integrator comprisis an up-down counter connected to count up upon receiving a command pulse from said signal generator and to count down upon receiving said sensed flow pulse from said flowrate sensor, said drive signal being a digital output of said up-down counter.

12. The apparatus of claim 11 wherein said up-down counter has an upper carry-out output and a preload input connected to receive a high count, and further comprising an overcount circuit connected to load said preload input upon receiving said upper carry-out output.

13. The apparatus of claim 11 wherein said up-down counter has a lower carry-out output and a clear input and further comprising an undercount circuit connected to clear said counter uponrreceiving said lower carry-out output.

14. The apparatus of claim 11 further comprising double-clocked flip-flops to synchronize said command pulses and sensed flow pulses.

15. The apparatus of claim 11 further comprising a digital-to-analog converter to convert said digital output drive signal to an analog pump drive signal.

16. The apparatus of claim 15 wherein said electric motor is a variable speed D.C. motor driven by said analog pump drive signal.

17. The apparatus of claim 11 wherein said up-down counter has a clear input and further comprising a command pulse monitor to monitor said commanded flowrate signal and to clear said counter when a lack of command pulses is sensed.

18. The apparatus of claim 17 wherein said command pulse monitor comprises a one-shot connected to receive said commanded flowrate signal as an input and to provide a low signal to a clear input of said counter upon sensing command pulses and to provide a high signal to said clear input when the pulses have not been received for a given period of time.

19. Medical apparatus comprising
a variable flowrate peristaltic pump including an electric motor controllable in response to a pump drive signal,
a signal generator generating a commanded flowrate signal indicating desired flowrate of said pump,
a flowrate sensor providing a sensed flowrate signal indicating sensed flowrate of said pump, and
an integrator connected to said sensor and generator to receive and integrate said commanded flowrate signal and said sensed flowrate signal, said integrator maintaining an electrical signal representing the difference over time in volume commanded to be pumped and the volume pumped, said integrator providing said pump drive signal based on said electrical signal, said pump drive signal being increased based on said commanded flowrate signal, thereby increasing the speed of said motor, and being decreased based on said sensed flowrate signal, thereby decreasing the speed of said motor, so as to achieve desired commanded volume over time.

20. Blood centrifuge apparatus comprising
a centrifuge having a blood inflow line and a plurality of output lines for separated fractions of blood,
a plurality of variable flowrate peristaltic pumps acting upon at least some of said lines,
each said pump including an electric motor controllable in response to a pump drive signal, said apparatus further comprising, for each said pump,
a signal generator generating a commanded flowrate signal indicating desired flowrate of said pump,
a flowrate sensor providing a sensed flowrate signal indicating sensed flowrate of said pump, and
an integrator connected to said sensor and generator to receive and integrate said commanded flowrate signal and said sensed flowrate signal, said integrator maintaining an electrical signal representing the difference over time in volume commanded to be pumped and the volume pumped, said integrator providing said pump drive signal based on said electrical signal, said pump drive signal being increased based on said commanded flowrate signal, thereby increasing the speed of said motor, and being decreased based on said sensed flowrate signal, thereby decreasing the speed of said motor, so as to achieve desired commanded volume over time.

* * * * *